Aug. 26, 1958 R. C. STILES 2,849,531

TELEGRAPH SYSTEM WITH AUTOMATIC SPEED CONTROL

Filed April 12, 1955 2 Sheets-Sheet 1

INVENTOR.
Richard C. Stiles
BY Smith, Olsen, Baird and Gulbrandsen.
Attys.

TELEGRAPH SYSTEM WITH AUTOMATIC SPEED CONTROL

Filed April 12, 1955

2 Sheets-Sheet 2

INVENTOR.
Richard C. Stiles
BY Smith, Olsen, Baird and Gulbrandsen.
Attys 2,849,531
Patented Aug. 26, 1958

2,849,531

TELEGRAPH SYSTEM WITH AUTOMATIC SPEED CONTROL

Richard C. Stiles, La Grange, Ill., assignor to General Telephone Laboratories, Incorporated, a corporation of Delaware Application April 12, 1955, Serial No. 500,879
18 Claims. (Cl. 178—17.5)

The present invention relates in general to automatic telegraph switching systems in which a tape is perforated in code form in accordance with an incoming message, is then analyzed by a tape reader and finally controls a tape transmitter to transmit the message over an outgoing line that is selected in accordance with the address of the message to reach the desired destination. More particularly, the invention relates to the provision of facilities in such a system for varying the speed of the operation of the tape reader to read the associated tape and the speed of operation of the transmitter to transmit the signals in accordance with the perforations on the associated tape at different speeds depending upon the amount of tape that has been accumulated in storage bins provided between the perforator and the tape reader and between the tape reader and the transmitter.

In automatic telegraph switching systems of the type disclosed in my copending application, Serial No. 260,854, filed December 10, 1951, now Patent No. 2,805,283, granted on September 3, 1957, and in the multiple message automatic telegraph switching system disclosed in my copending application, Serial No. 387,354, filed October 21, 1953, the operation of the tape readers and the tape transmitters are at a constant speed governed by the motor individual to the associated units. With the arrangement disclosed in the foregoing applications, tape that is perforated by the incoming line reperforator unit and which is to be analyzed by the associated tape reader in many instances accumulated to such an extent that the incoming line would be marked busy until the tape reader disposed of at least a portion of the accumulated tape. This same arrangement is provided between the tape reader and the associated transmitter.

It is the principal object of the present invention to provide automatic means for adjusting the speed at which the tape reader will read the associated tape and the speed at which the transmitter will transmit signals in accordance with the message perforated on the tape, depending upon the amount of tape that has accumulated between the perforator and the tape reader and between the tape reader and the transmitter.

It is still another object of the invention to provide means for driving the tape reader at two different speeds and for driving the tape transmitter at three different speeds depending upon the amount of accumulated tape in the respective units.

It is still another object of the invention to automatically reduce the speed of operation of the tape reader and the associated tape transmitter whenever the amount of accumulated tape has been reduced below the predetermined amount.

Figure 1:
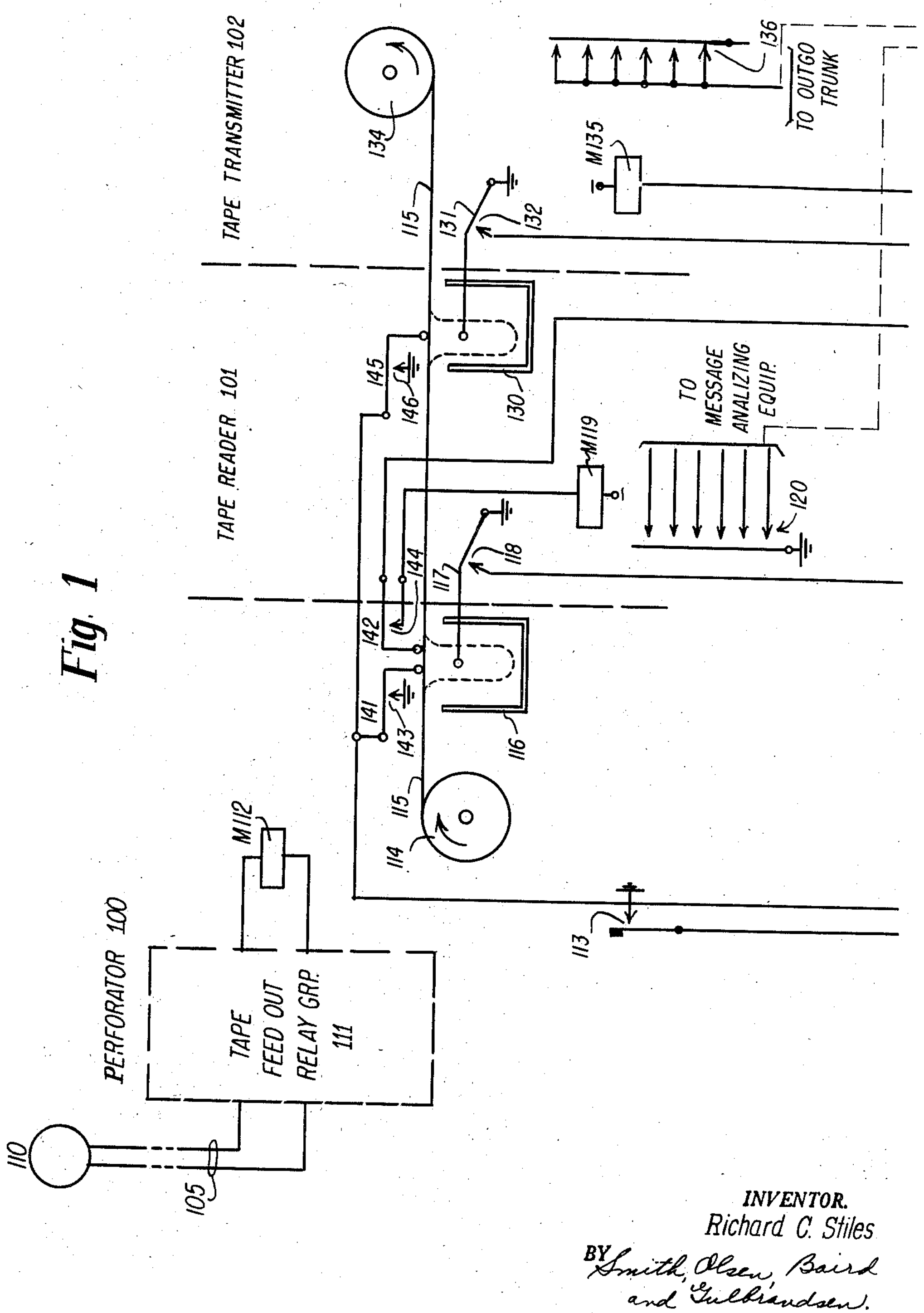
Figure 2:
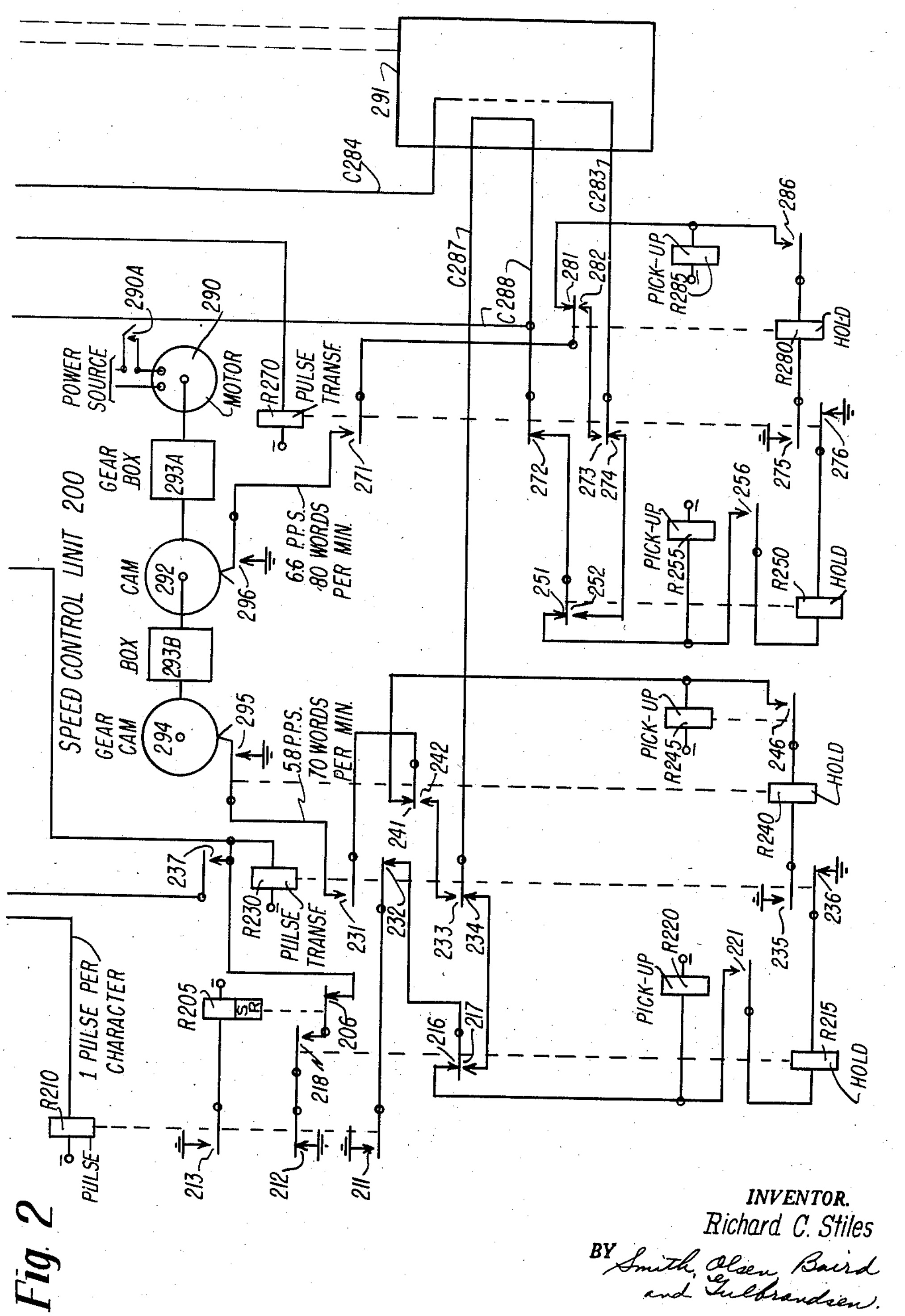

The present invention, both as to its organization and method of operation, together with further objects and advantages thereof, will best be understood by reference to the following specification taken in conjunction with the accompanying drawings in which:

Fig. 1 illustrates, partially in block diagram form, a tape perforator associated with an incoming line at a telegraph switching center, a tape reader that is utilized to analyze the message perforated on the associated tape, and a tape transmitter for transmitting signals corresponding with the perforated message; and Fig. 2 shows a speed control unit for determining the speed of operation of the tape reader and tape transmitter associated with the particular perforator of Fig. 1.

In the embodiment of the invention shown in the drawings and described herein, the distant office 110 is connected to the switching center illustrated in Figs. 1 and 2 over an interconnecting telegraph line 105 which is terminated in the illustrated switching center in a tape feed out relay group 111 of the type, for example, illustrated in the above mentioned copending application Serial No. 260,854, now Patent No. 2,805,283, issued September 3, 1957. The tape feed out relay group 111 may be of any conventional type and is provided to control the perforator 100 to automatically feed out "blank" tape after an end-of-message code has been received, in order to provide sufficient tape to permit the end-of-message code to be fed through both the tape reader 101 and the tape transmitter 102. The perforating magnet M112 is controlled over the above mentioned telegraph line from the distant office 110 and, in a conventional manner, will perforate the tape 115 which is stored on the reel 114. As each character is perforated in code form on the associated tape 115, the contacts 113 will be mechanically or magnetically controlled to transmit impulses to the pulse relay R210. In addition to the foregoing, the perforator 100 is provided with a tape storage bin 116 having the slack tape switch 117 which is arranged to close the contacts 118 whenever a predetermined amount of perforated tape 115 has been accumulated in the storage bin 116. Also, the tight tape switches 141 and 142 are arranged to close the respective contacts 143 and 144 whenever a slack tape condition exists in the tape storage bin 116 between the tape perforator 100 and the tape reader 101. These contacts will open whenever a tight tape condition occurs.

Tape reader 101 includes the magnet M119 which is controlled by impulses transmitted thereto to control the tape reader 101 so that it will sense the code perforations appearing on the associated tape 115. Depending upon the perforations on the tape 115, the sensing contacts 120 will be controlled in a conventional manner to transmit corresponding code signals to the message analyzing equipment provided in the switching apparatus 291 illustrated in block diagram form in Fig. 2.

In a system of the type disclosed in the above mentioned application Serial No. 260,854, the tape reader 101 in analyzing the perforations in the associated tape will control the switching apparatus in the switching center schematically illustrated by the block diagram 291 to establish a connection with the apparatus associated with an outgoing line extending in the direction that the message must be transmitted by the transmitter 102 to reach the desired destination. The facilities and apparatus for routing a telegraph message do not form a part of the present invention and may be of conventional construction.

During the time the perforated tape 115 is analyzed by the tape reader 101, it is accumulated in the tape storage bin 130 where the slack tape switch 131 is arranged to close its contacts 132 when a predetermined amount of tape has been accumulated in the associated bin 130. Also the tight tape switch 145 is arranged to close its contacts 146 whenever a slack tape condition exists between the tape reader 101 and the tape transmitter 102. These contacts will open whenever a tight tape condition occurs. The tape transmitter 102 is provided with a magnet M135 which is operated by pulses transmitted thereto so that the transmitter will transmit signals by means of the control contacts 136 to the outgoing trunk that has been selected by the switching apparatus 291. Thereafter, the perforated tape 115 will be wound on the reel 134 where it will be accumulated for record purposes by the telegraph company.

It is assumed for the purpose of this description that as soon as the distant office 110 starts transmitting a message over the interconnecting line 105, the perforator M112 functions in the conventional manner to perforate the associated tape 115 in code form in accordance with the characters of the message. Each character, including "blanks," etc., will advance the tape 115 step-by-step in a conventional manner and the contacts 113 will be intermittently closed in order to complete an obvious circuit for the pulse relay R210. Thus, each character of a message operates the relay R210. The first time the relay R210 operates, it completes, at its contacts 211, a circuit including the contacts 232 and 216 for operating the pick-up relay R220. Also, at the contacts 213, the relay R210 completes a circuit for operating the slow-to-release relay R205. This relay remains operated during the momentary interruption in its circuit at the contacts 213.

The relay R210 will restore to normal after the first character has been perforated on the tape 115 by the magnet M112 and will thereby interrupt, at its contacts 211, the above circuit for the pick-up relay R220. However, a circuit is now completed by way of the contacts 221, the winding of the hold relay R215 and ground at contacts 236 to operate the latter relay and to hold the pick-up relay R220 in its operated position. Thus, it is apparent that the hold relay R215 remains short-circuited while the operating circuit is completed for the pick-up relay R220 from ground at contacts 211 and the removal of ground at contacts 211 will permit the pick-up relay R220 to lock in series with the relay R215. Consequently, the first impulse is absorbed in order to prevent a portion of an impulse from being transmitted to the tape reader 101. It should be noted that the perforation of the first character in the tape 115 by the perforator 100 created a slack tape condition to occur in order to close the tight tape contacts 143 and 144 to close.

As soon as the hold relay R215 operates it interrupts, at its contacts 216, the initial impulse circuit for the pick-up relay R220 and, at its contacts 217, it prepares a point in the circuit traced hereinafter for transmitting the pulses from the pulse relay R210 to the magnet M119 of the tape reader 101.

Accordingly, the second character counted by the pulse relay R210 is repeated at the contacts 211 over a circuit including the contacts 232, 217 and 234, conductor C287, normally closed circuits (not shown) in the switching apparatus 291, conductor C288, tight tape switch contacts 144 (now closed) and the winding of the magnet M119, to battery. A parallel circuit is also completed by way of the conductor C288, contacts 272 and 251 to the winding of the pick-up relay R255. Consequently, the magnet M119 and the pick-up relay R255 both operate as a result of the transmission of the second impulse by the pulse relay R210.

At the present time, the tape 115 between the perforator 100 and the tape reader 101, is in a slack condition in order to close the contacts 143 and 144 but the slack tape switch 117 has not been controlled to close its contacts 118 due to the fact that a predetermined amount of perforated tape has not been accumulated in the storage bin 116. At the present time, synchronous operation of the magnet M112 and the magnet M119 will cause the tape 115 to step simultaneously through the perforator 100 and the tape reader 101. During this period, the control contacts 120 of the tape reader 101 will transmit signals to the switching apparatus 291 where the message will be analyzed. At the present time, however, "blank" tape will be read by the tape reader 101 and signals corresponding to the "blank" characters will be transmitted by the contacts 120 to the switching apparatus 291.

When the first pulse transmitted to the magnet M119 and the pick-up relay R255 is terminated, the magnet will restore to normal and the pick-up relay R255 will lock itself over a circuit including its contacts 256, the winding of the hold relay R250, to ground at contacts 276. Thus, it is apparent that the pick-up relays R220 and R255, as well as the hold relays R215 and R250, operate in exactly the same manner but in response to successive impulses transmitted by the pulse relay R210. In view of the foregoing, it will be apparent that the hold relay R250 upon operating will transfer the pulsing circuit, including the conductor C288 by way of the contacts 272, 252 and 274, conductor C283 to the switching apparatus 291. At the present time, the switching apparatus 291 has not received sufficient characters from the tape reader 101 to select the outgoing trunk corresponding to the address appearing on the received message. Therefore, the pulses now transmitted over the conductor C283 will not be extended through the switching apparatus 291 and conductor C284 to operate the magnet M135 in the tape transmitter 102. In other words, the tape transmitter 102 will not be operated to start the transmitting function until an outgoing trunk extending toward the destination of the message has been selected.

The message received by the perforator 100 will be perforated on the tape 115 in a conventional manner, for example, as described in the above mentioned application, Serial No. 260,854, now Pat. No. 2,805,283, issued September 3, 1957, and this information will be read by the the tape reader 101 and transmitted to the message analyzing equipment of the switching apparatus 291.

In a system of the type disclosed in the above mentioned application, the first code information appearing on the tape 115 will include a start-of-message code and a message number which will be read by the tape reader 101 and will be stored in the message analyzing equipment of the switching apparatus 291. As soon as a proper start-of-message code is received, a comparison is made between the received message number and the number of the message that is pre-registered in the switching apparatus 291. If the number received compares with the number stored, then the switching apparatus 291 will automatically function to associate apparatus that will analyze the code information corresponding to the class or precedence of the message and the address of the destination of the message so that the proper outgoing trunk may be selected to route the message to the destination identified by the address.

As soon as the switching apparatus 291 selects the proper outgoing trunk over which the message may be repeated to reach the destination identified by the address, then the pulsing circuit including the conductors C283 and C284 will be completed for the magnet M135 of the tape transmitter 102. This magnet will now operate in synchronism with the magnets M112 and M119 so that the tape 115 will be stepped along through each of the above units at the same rate of speed. By means of the control contacts 136, the tape transmitter 102 will repeat code signals corresponding to the perforations appearing on the associated tape 115 to the outgoing trunk that has been selected by the switching apparatus 291. It is apparent that while the tape transmitter 102 remains in an idle condition as the tape reader 101 analyzes the perforations appearing in the associated tape 115, the tape fed through the tape reader 101 will be accumulated in the tape storage bin 130. Normally, however, the amount of tape that is accumulated in the bin 130 will only include that portion of the message that contains the start-of-message code, the message number, the class or precedence of the message and the address of the message. Thereafter, the tape transmitter 102 will be started so that it can transmit this information to the outgoing trunk that has in the meantime been selected in accordance with the address of the message. The slack tape mechanism 131 under these conditions will not cause the operation of the contacts 132 but the tight tape switch 145 will close its contacts 146 as soon as the slack tape condition exists. Furthermore, the amount of slack tape that is accumulated in the storage bin 116 between the perforator 100 and the tape reader 101 will be negligible.

In view of the foregoing, it will be appreciated that the operation of magnets M119 and M135 of the tape reader 101 and the tape transmitter 102 will be controlled from pulses generated by the impulse relay R210 under control of the character counting contacts 113 in the perforator 100. It should also be understood, however, that the tape feed out relay circuit 111 associated with the perforator 100 may be automatically controlled at the end of any given message to cause the perforator 100 to feed out sufficient "blank" tape following an end-of-message code signal to enable both the tape reader 101 and the tape transmitter 102 to successively respond to the end-of-message signal perforated on the tape 115 before the operation of the tape feed out relay group 111 is terminated. During the feed out of "blank" tape by the perforator 100, the character counting contact 113 will continue to function in the manner described above whereby the pulse relay R210 will repeat the necessary control impulses to the magnet M119 of the tape reader 101 and to the magnet M135 of the tape transmitter 102.

The above described operation of the apparatus disclosed in Figs. 1 and 2 is normally effective as long as successive messages are spaced apart sufficiently to enable the tape feed out relay circuit 111 to perform its operation before a succeeding message is received from the distant office 110. If successive messages follow each other rather closely, the operations of the magnet M112 in accordance with the characters appearing on the received message will prevent operation of the tape feed out relay group 111. Accordingly, the tape 115 will be perforated in accordance with successive messages instead of by the "blank" tape that is normally fed out by the perforator 100 between successive messages if messages do not immediately follow one another. It should be appreciated that when messages follow each other rather closely, the storage bin 116 in particular, and in many cases the storage bin 130, will accumulate a great deal of perforated tape.

In the present invention it is contemplated that the slack tape mechanism 117 will be arranged to close its contacts 118 after a predetermined amount (for example, sufficient to fill one-half of the bin) of tape has been accumulated in the storage bin 116. If it is assumed that the contacts 113 are at the same time being controlled in response to the operation of the magnet M112 in the perforator 100 as each character is perforated on the associated tape, the pulse relay R210 will, at its contacts 211, continue to transmit the control pulses to the magnet M119 of the tape reader 101 and to the magnet M135 of the tape transmitter 102.

If it is assumed that the predetermined amount of slack tape is now accumulated in the storage bin 116, the slack tape mechanism 117 will have moved sufficiently to close its associated contacts 118 and thus completes an obvious circuit for operating the pulse transfer relay R230. The relay R230 upon operating performs various controls whereby the pulses normally transmitted by the contacts 211 on the relay R210 will be disconnected and faster pulses generated by the cam 294 will instead be transmitted to the magnets M119 and M135. In this connection, it should be noted that the motor 290 is a conventional alternating current motor that is connected to a power source through a manually actuated switch 290A which is assumed to be closed at the present time. Through the medium of the gear box 293A the motor rotates the cam 292 at a speed that will close its contacts 296 to transmit ground pulses at the rate of 6.6 pulses per second. This is equivalent to approximately 80 words per minute.

In addition to the foregoing, the motor 290 through the medium of the gear box 293B controls the cam 294 so that the contacts 295 are closed to generate 5.8 pulses per second. This is equivalent to approximately 70 words per minute.

Accordingly, it will be appreciated that as soon as the pulse transfer relay R230 operates it interrupts, at its contacts 232, a point in the previously described pulsing circuit whereby the relay R210 transmits pulses to the conductor C287. Also, at its contacts 231, the relay R230 completes a circuit including ground at the impulsing contacts 295, contacts 241 and the winding of the pick-up relay R245 to battery in order to operate the latter relay. At the end of the first pulse following the operation of the relay R230, the relay R245 will lock itself over a circuit including its contacts 246, the winding of the hold relay R240 and ground at contacts 235 on the operated relay R230. The relay R240, at its contacts 241 and 242, will transfer the impulsing circuit including the contacts 295 from the winding of the pick-up relay R245, to a circuit including the contacts 233 and the conductor C287. Accordingly, the pulses transmitted at 5.8 p. p. s. by the cam 294 will be transmitted to the conductor C287 and then to the winding of the magnet M119 of the tape reader 101. The rate at which the magnet M119 now operates and restores is the same as the rate at which the impulsing contacts 295 are operated by the cam 294, instead of at the rate at which the relay R210 is operated by the perforator 100. This increase in the speed of operation of the magnet M119 is normally sufficient to reduce the amount of tape accumulated at the storage bin 116 even though the perforator 100 continues to operate under control of incoming messages.

It should be noted that as a further result of the operation of the pulse transfer relay R230 it interrupts, at its contacts 236, the previously described locking circuit for the hold relay R215 and the pick-up relay R220 so that these relays will now restore to normal. At the contacts 237, the relay R230 locks itself to ground at contacts 143 on the tight tape switch 141 or to ground at the contacts 146 on the tight tape switch 145. Accordingly, relay R230 upon operating will remain operated until both contacts 143 and 146 are open. Actually, the pulses transmitted from the contacts 295 on the cam 294 over the conductor C287 will be extended through the switching apparatus 291 to the conductor C288 in order to control the magnet M119. The pulses will also be extended by way of the previously described circuit including the contacts 272, 252 and 274, conductor C283, switching apparatus 291 and conductor C284 in order to control the magnet M135 of the tape transmitter 102 at the same rate of speed as the tape reader 101. This will tend to prevent the tape 115 from being accumulated in the storage bin 130 due to the increase in speed of operation of the tape reader 101.

Although an attempt is made with the foregoing circuit arrangement to transmit 5.8 pulses per second, which is equivalent to 70 words per minute, to both the tape reader 101 and the tape transmitter 102 to prevent additional tape from accumulating in the storage bin 130, some delay is generally encountered as the tape reader 101 analyzes the associated tape to determine the route over which the message must be transmitted and to control the switching apparatus 291 to connect with the particular outgoing trunk over which the message is to be sent by the tape transmitter 102. During the interval of time that the switching operations are being performed by the switching apparatus 291, the circuit therethrough including the conductors C283 and C284 may be open to prevent operation of the magnet M135. Consequently, there are times during the operation of the apparatus that the storage bin 130 will accumulate the tape 115 while the tape transmitter 102 is not in operation.

In the event that a predetermined amount of tape is accumulated in the storage bin 130 and is sufficient to actuate the slack tape mechanism 131 to close its contacts 132 (approximately 50% of the bin full) then the pulse transfer relay R270 will be operated over an obvious circuit. This relay performs substantially the same switching operations as the pulse transfer relay R230 and now will render the contacts 296 associated with the cam 292 effective to transmit 6.6 pulses per second to the magnet M135 of the tape transmitter 102. However, the above mentioned circuit whereby the cam 294 continues to control the contacts 295 to transmit 5.8 pulses per second to the magnet M119 will be retained. In other words, the tape reader 101 will operate at a rate sufficient to read approximately 70 words per minute whereas the tape transmitter 102 will be operated at a rate sufficient to transmit signals at approximately 80 words per minute.

At the contacts 271, the relay R270 completes a circuit whereby the first pulse transmitted by the contacts 296 on the cam 292 is extended by way of the contacts 281 to the winding of the pick-up relay R285. The latter relay now operates and at the end of the first impulse immediately locks itself over a circuit including the contacts 286, winding of the hold relay R280 and ground at contacts 275. Accordingly, the relay R280 now operates and transfers the initial pulse circuit for the relay R285 to the conductor C283. This circuit includes ground at the contacts 296, contacts 271, 272 and 273, conductor C283, the switching apparatus 291, conductor C284 and the winding of the magnet M135, to battery. Accordingly, the magnet M135 will now be operated at the rate of 6.6 pulses per second under control of the contacts 296 on the cam 292 and will thereby transmit approximately 80 words per minute. As a further result of the operation of relay R270, at its contacts 272, it disconnects the pulsing conductor C288 from the circuit including the conductor C283 and, at its contacts 276, it interrupts the locking circuit for the hold relay R250 and the pick-up relay R255. The latter relays now restore to normal.

At the present time, the tape reader 101 is operated by pulses transmitted at the rate of 5.8 pulses per second by the cam 294, and the tape transmitter 102 is operated at the rate of 6.6 pulses per second by the cam 292. Since the tape transmitter 102 is operating at the faster rate whereby approximately 80 words per minute will be transmitted over the outgoing trunk, the accumulated tape in the bin 130 will gradually be reduced. When the tape in the bin 130 is reduced a predetermined amount sufficiently to cause the slack tape mechanism 131 to open its contacts 132, the above traced circuit for the pulse transfer relay R270 will be interrupted. Accordingly, the relay R270 will now restore to normal to interrupt the above described circuit for transmitting the pulses from the cam contacts 296. As a further result of the restoration of the relay R270, it again completes, at its contacts 272, the previously described pulsing circuit which includes the contacts 295 associated with the cam 294 whereby 5.8 pulses per second transmitted over the conductors C287 and C288 to the magnet M119 will be reconnected to the conductors C283 and C284 extending to the magnet M135. In this connection it will be recalled that the first pulse completes the operating circuit to the relay R255 and at the termination of the first pulse (after the restoration of relay R270) the pick-up relay R255 will lock itself in series with the hold relay R250 which also operates. Accordingly, the contacts 252 will be closed to connect the conductor C283 to the conductor C288. As long as this condition exists, the tape reader 101 and the tape transmitter 102 will be operated by 5.8 pulses per second (or approximately 70 words per minute) under control of the cam 294.

When the amount of tape accumulated in the storage bin 116 is reduced sufficiently, the slack tape mechanism 117 will be actuated to open its contacts 118 and thereby interrupt the circuit for the pulse transfer relay R230 but this relay remains locked in its operated position to ground at contacts 143 or 146 until the tape 115 is tight between the perforator 100 and the reader 101 and between the reader 101 and the transmitter 102. Since the pulse transfer relay R230 has been operated by the accumulation of a predetermined amount of tape in the storage bin 116, it will then lock itself by way of its contacts 237 to the contacts 143 or the contacts 146 on the tight tape switches 141 and 145. Accordingly, the relay R230 cannot be restored to normal until a tight tape condition exists in the bins 116 and 130 between the perforator 100 and the tape transmitter 102. Therefore, the pulses transmitted by the contacts 295 on the cam 294 will continue to control the magnets M119 and M135 in the manner described previously.

When the end-of-message code of the last message transmitted to the magnet M112 is received, the tape feed out relay group 111 will then control the magnet M112 so that a predetermined number of "blank" characters are perforated on the tape 115. Sufficient characters are automatically perforated to extend the end-of-message code of the last received message through the tape reader 101 and through the tape transmitter 102. However, when the last of the predetermined number of "blank" characters have been perforated, the contacts 113 associated with the perforator 100 will no longer be intermittently operated in accordance with each character so that the pulse relay R210 now remains in its restored position. At its contacts 213, the pulse relay R210 opens the circuit for the slow-to-release relay R205 which now restores to normal. This relay performs no control at this time inasmuch as the pulse transfer relay R230 is locked in its operated position to the tight tape switch contacts 143 or 146 associated with the storage bins 116 and 130 respectively.

After all of the information on the tape 115 has been read by the tape reader 101, the tight tape contacts 143 will be opened under control of the tight tape condition existing in the storage bin 116. Finally, when the tight tape condition occurs in the storage bin 130 indicating that all of the information regarding the last perforated message has been transmitted by the tape transmitter 102, the tight tape contacts 146 will also be opened. Thus, the last point in the locking circuit for the pulse transfer relay R230 will be interrupted in order to restore the latter relay. Accordingly, the pulses transmitted by the contacts 295 on the cam 294 will be disconnected at the contacts 231. Also, at the contacts 235, the pulse transfer relay R230 interrupts the holding circuit for the hold relay R240 and the pick-up relay R245 thereby to restore these relays to normal.

Referring again to the tape reader 101, it should be noted that when the tight tape condition occurs in the tape 115 in the storage bin 116, the tight tape contacts 144 are opened by the tight tape switch 142 in order to interrupt a point in the circuit for the magnet M119. The magnet M119 is brought to rest even though the pulses are still being transmitted to the magnet M135.

It may be well to mention at this time that once a sufficient amount of the tape 115 has accumulated in the bin 116 to cause the actuation of the slack tape contacts 118, the speed of operation of the magnet M119 associated with the tape reader 101 cannot be reduced below 5.8 pulses per second (70 words per minute), due to the fact that the pulse transfer relay R230 is locked in its operated position to the tight tape contact 143. On the other hand, the tape transmitter 102 may be actuated to 5.8 pulses per second when the pulse transfer relay R230 has been operated by the tape reader 101; it may be then operated at 6.6 pulses per second in order to transmit approximately 80 words per minute when the predetermined amount of tape is accumulated in the storage bin 130 and has caused the slack tape contacts 132 to operate the transfer relay R270; it may be reduced in speed back to 5.8 pulses per second when the amount of accumulated tape has caused the contacts 132 to open; and it will continue to transmit at 70 words per minute (assuming that the contacts 132 are not again actuated) until the tight tape condition described above reoccurs.

Under certain conditions, however, the tape 115 will not be accumulated in either the storage bin 116 or the storage bin 130 to cause the actuation of the slack tape switches 117 or 131. Under this condition, the pulse transfer relays R230 or R270 will not be operated. Consequently, the pulses for operating the magnets M119 and M135 must be provided at the contacts 211 on the pulse relay R210. This circuit has been previously described and will not be repeated at this time. Inasmuch as the pulse relay R210 is directly controlled by the character counter contacts 113 on the perforator 100, the continued pulsing of the magnets M119 and M135 depends upon the continued operation of the pulse relay R210.

As long as the perforator 100 continues to actuate the contacts 113 in accordance with characters of the received messages or "blank" characters, the tape reader 101 and the tape transmitter 102 will continue to operate in the manner described. However, when an end-of-message code is received and the tape feed-out relay group 111 causes the perforator 100 to perforate the predetermined number of "blank" characters, the contacts 113 will cease to operate as soon as all of the "blank" characters have been perforated. This will terminate the transmission of pulses to the magnets M119 and M135 prior to the completion of the operation of the tape reader 101 and the tape transmitter 102 to analyze and transmit the information contained on the perforated tape.

In order to prevent this condition from occurring, the slow-to-release relay R205 has been provided. This relay slowly restores to normal when the pulse relay R210 is brought to rest in a deenergized or restored condition. As soon as the relay restores to normal, it closes its contacts 206 to complete a circuit including the contacts 212, 218 and 206 to operate the pulse transfer relay R230. This relay immediately locks itself by way of its contacts 236 to the previously described tight tape contacts 143 or 146 so that the relay will remain in its operated condition until a tight tape condition occurs in the bins 116 and 130. It should be understood, however, that the pick-up relay R220 is locked in its operated position in series with the operated hold relay R215 as long as pulses are being transmitted to the conductor C287 by the contacts 211 on the pulse relay R210. As soon as the pulse transfer relay R230 is operated, upon the restoration of the slow-to-release relay R205, as noted above, then the contacts 236 will interrupt the locking circuit for the hold relay R215 and pick-up relay R220 in order to restore these relays. At the contacts 218 the hold relay R215 will interrupt a point in the initial operating circuit for the pulse transfer relay R230, but the latter relay remains in its locked position as described above.

The controls exercised in response to the operation of the pulse transfer relay R230 have been described hereinbefore and it is only necessary to mention at this time that at the contacts 231, the relay R230 will now connect the 5.8 pulses per second transmitted by the contacts 295 on the cam 294, to the conductor C287 so that both the tape reader 101 and the tape transmitter 102 will be controlled to read and transmit the information contained on the perforated tape 115 at approximately 70 words per minute. It will be apparent from the previous description that when the tight tape condition occurs after the completion of the transmission of all of the information perforated on the tape 115, the tight tape switches 141 and 145 will again cause the pulse transfer relay R230 to restore to normal and condition the speed control unit 200 so that it can be reoperated in the manner previously explained.

If another message is received by the perforator 100 while the tape reader 101 and the tape transmitter 102 are being controlled by the 5.8 pulses per second, the relay R210 will respond in the usual manner but nothing will happen to change the pulsing rate of the magnets M119 or M135 unless the predetermined amount of tape is accumulated in the storage bins 116 or 130 to cause the operation of the respective slack tape switches 117 and 131. These operations have been explained previously and will not be repeated.

While the preferred embodiment of the present invention has been shown and described, it will be understood by those skilled in the art that various modifications may be made therein which are within the true spirit and scope of the invention.

What is claimed is:

1. In a telegraph system having a tape reader for sensing telegraph messages that have been perforated on a tape by a tape perforator, a storage bin between said tape perforator and said tape reader, first means governed in accordance with the accumulation of a first predetermined amount of tape in said tape storage bin for controlling said tape reader to sense said tape at a first rate of speed, and second means operated in response to the accumulation of a second predetermined amount of tape in said tape storage bin for controlling said tape reader to sense said tape at a second rate of speed.

2. In a telegraph system having a tape reader for sensing telegraph messages that have been perforated on a tape by a tape perforator, a storage bin between said tape perforator and said tape reader, first means governed in accordance with the accumulation of a first predetermined amount of tape in said tape storage bin for controlling said tape reader to sense said tape at a first rate of speed, second means operated in response to the accumulation of a second predetermined amount of tape in said tape storage bin for controlling said tape reader to sense said tape at a second rate of speed, and means controlled in response to said operation of said second means for preventing the rate of speed at which said tape reader senses said tape from being altered to said first rate of speed until all accumulated tape has been sensed by said tape reader.

3. The telegraph system as set forth in claim 2, including a tight tape switch actuated in response to a tight tape condition of said tape in said storage bin, and means controlled in response to the actuation of said tight tape switch for disconnecting said tape reader from said first means and said second means.

4. In a telegraph system having a tape perforator for perforating a tape in code form in accordance with characters in a telegraph message received over an incoming line and having a tape reader for sensing the perforations in said tape, a storage bin between said tape perforator and said tape reader for storing said tape after it is perforated, first means controlled by said perforator for transmitting a control pulse to said tape reader in response to the perforations of each character in said tape so that said tape reader senses said tape at substantially the same rate at which each character is perforated in said tape, second means for transmitting control pulses at a predetermined rate which is faster than the rate of transmission of control pulses by said first means, and means controlled in response to the accumulation of a predetermined amount of tape in said storage bin for disconnecting said first control pulse transmitting means from said tape reader and for connecting said tape reader to said second control pulse transmitting means in order to control said tape reader to sense said perforations in said tape at said predetermined faster rate.

5. In a telegraph system having a tape reader for sensing telegraph messages that have been perforated on a tape by a tape perforator, a storage bin between said tape perforator and said tape reader, a relay operated as each character of said message is perforated on said tape by said tape perforator, contacts controlled by said relay for normally operating said tape reader to sense said tape, a pulse generator for transmitting control pulses at a predetermined rate greater than the rate at which the message characters are perforated on said tape, connecting means operated to connect said pulse generator to said tape transmitter in response to the accumulation of a predetermined amount of tape in said tape storage bin or in response to the restoration of said relay at the end of the message perforated on said tape, and means controlled by said connecting means for disconnecting said contacts on said relay from said tape reader until all tape accumulated in said storage bin has been sensed by said tape reader.

6. In a telegraph system having an incoming line over which incoming telegraph messages are received to control a tape perforator step-by-step to produce a record of each of the messages on a perforated tape, a tape reader and a tape transmitter through which said perforated tape is stepped, means controlled in response to each step of said step-by-step movement of said tape by said tape perforator for transmitting a control pulse to said tape reader, means selectively controlled by said tape reader for transmitting said pulses to said tape transmitter, means in said tape reader and said tape transmitter controlled by said pulses for governing the rate of speed of the step-by-step movement of said tape through said tape reader and said tape transmitter, and means controlled by the accumulation of tape between said tape perforator and said tape reader for increasing the speed of transmission of impulses to said tape reader and to said tape transmitter.

7. In a telegraph system having a tape reader for sensing telegraph messages as they are perforated on a tape by a tape perforator and having a tape transmitter for transmitting said messages after they have been sensed by said tape reader, means for normally operating said tape reader and said tape transmitter at the same speed as said tape perforator, a first storage bin between said tape perforator and said tape reader for storing said tape as it is perforated, a second storage bin between said tape reader and said tape transmitter for storing said tape as it is sensed by said tape reader, means governed in response to the storage of a predetermined amount of tape in said first storage bin for selectively increasing the speed at which said tape reader operates to sense said stored tape and the speed at which said tape transmitter operates to transmit said messages, and means governed in response to the storage of a predetermined amount of tape in said second storage bin for selectively increasing the speed at which said tape transmitter operates to transmit said messages so that it operates faster than said tape reader.

8. In a telegraph system having a tape reader for sensing telegraph messages as they are perforated on a tape by a tape perforator and having a tape transmitter for transmitting said messages after the tape has been sensed by said tape reader, a first storage bin between said tape perforator and said tape reader for storing said tape as it is perforated, a second storage bin between said tape reader and said tape transmitter for storing said tape as it is sensed by said tape reader, means normally controlled to actuate said tape reader to sense said tape and said tape transmitter to transmit the messages on said tape at a first rate of speed, means governed in response to the storage of a predetermined amount of tape in said first storage bin for altering the speed of operation of said tape reader and said tape transmitter from said first rate to a second predetermined faster rate, and means governed in response to the storage of a predetermined amount of tape in said second storage bin for altering said speed of operation of said tape transmitter from said second predetermined rate to a third predetermined faster rate.

9. In a telegraph system having a tape reader for sensing telegraph messages as they are perforated on a tape by a tape perforator and having a tape transmitter for transmitting said messages after the tape has been sensed by said tape reader, a first storage bin between said tape perforator and said tape reader for storing said tape as it is perforated, a second storage bin between said tape reader and said tape transmitter for storing said tape as it is sensed by said tape reader, means governed in accordance with the storage of a first predetermined amount of tape in said first storage bin for selectively operating said tape reader and said tape transmitter at the same rate of speed at which tape perforator perforates said tape, means governed in response to the storage of a second predetermined amount of tape in said first storage bin for selectively operating said tape reader and said tape transmitter at a faster predetermined rate of speed, and means governed in response to the storage of a predetermined amount of tape in said second storage bin for selectively operating said tape transmitter at a faster rate of speed than said tape reader.

10. In a telegraph system having a tape reader for sensing telegraph messages as they are perforated on a tape by a tape perforator and having a tape transmitter for transmitting said messages after they have been sensed by said tape reader, a first storage bin between said tape perforator and said tape reader for storing said perforated tape, a second storage bin between said tape reader and said tape transmitter for storing said tape after it has passed through said tape reader, first means controlled by said tape perforator for operating said tape reader and said tape transmitter at the same rate of speed as the speed of operation of said tape perforator, second means operated in response to the accumulation of a first predetermined amount of tape in said first storage bin for controlling said tape reader to sense said tape at a second fixed predetermined rate of speed and for controlling said tape transmitter to transmit the messages perforated on said tape at said fixed second rate of speed, and third means operated in response to the accumulation of a first predetermined amount of tape in said second storage bin for controlling said tape transmitter to transmit said messages perforated on said tape at a third fixed rate of speed.

11. In a telegraph system having a tape reader for sensing telegraph messages as they are perforated on a tape by a tape perforator and having a tape transmitter for transmitting said messages after they have been sensed by said tape reader, means for normally operating said tape reader and said tape transmitter at the same speed as said tape perforator, a first storage bin between said tape perforator and said tape reader for storing said tape as it is perforated, a second storage bin between said tape reader and said tape transmitter for storing said tape as it is sensed by said tape reader, a first pulse generator and a second pulse generator for generating control pulses at first and second speeds, means governed in response to the storage of a predetermined amount of tape in said first storage bin for connecting said first pulse generator to said tape reader in order to operate said tape reader to sense said stored tape at said first speed and for connecting said first pulse generator to said tape transmitter in order to operate said tape transmitter to transmit messages on said tape at said first speed, and means governed in response to the storage of a predetermined amount of tape in said second storage bin for disconnecting said first pulse generator from said tape transmitter and for connecting said second pulse generator to said tape transmitter in order to operate said tape transmitter to transmit said messages on said tape at said second speed.

12. In a telegraph system having a tape reader for sensing the characters forming telegraph messages as they are perforated on a tape by a tape perforator and having a tape transmitter for transmitting the characters of said messages after they have been sensed by said tape reader, a first relay normally operated by said perforator as each character is perforated in said tape to transmit pulses for operating said tape reader and said tape transmitter at the same speed as said tape perforator, first pulse absorbing means for absorbing the first pulse transmitted by said first relay in order to prevent said tape reader and said tape transmitter from responding to an incomplete first pulse, second pulse absorbing means for absorbing the second pulse transmitted by said first relay in order to prevent said tape transmitter from responding to an incomplete second pulse, a first storage bin between said tape perforator and said tape reader for storing said tape as it is perforated, a second storage bin between said tape reader and said tape transmitter for storing said tape as it is sensed by said tape reader, a first pulse generator and a second pulse generator for generating control pulses at first and second speeds, said first and second speeds being faster than said speed at which pulses are transmitted by said first relay, first tape controlled means operated in response to the storage of a predetermined amount of tape in said first storage bin for disconnecting said pulses transmitted by said first relay from said tape reader and from said tape transmitter and for connecting said first pulse generator to said tape reader in order to operate said tape reader to sense said stored tape at said first speed and for connecting said first pulse generator to said tape transmitter in order to operate said tape transmitter to transmit messages on said tape at said first speed, second tape controlled means operated in response to the storage of a predetermined amount of tape in said second storage bin for disconnecting said first pulse generator from said tape transmitter and for connecting said second pulse generator to said tape transmitter in order to operate said tape transmitter to transmit said messages on said tape at said second speed.

13. The system set forth in claim 12, wherein said second tape controlled means disconnects said second pulse generator and reconnects said first pulse generator to said tape transmitter in response to the reduction in the amount of tape in said second storage bin below said predetermined amount, and additional tape controlled means associated with said second storage bin for locking said first tape controlled means in an operated position until all of said tape accumulated in said second storage bin is transmitted by said transmitter.

14. The system set forth in claim 13, including additional tape controlled means associated with said first storage bin for locking said first tape controlled means in an operated position until all of said tape accumulated in said first storage bin has been sensed by said tape reader.

15. In a telegraph system having a tape reader for sensing telegraph messages as they are perforated on a tape by a tape perforator and having a tape transmitter for transmitting said messages after the tape has been sensed by said tape reader, a storage bin between said tape reader and said tape transmitter for storing said tape as it is sensed by said tape reader, means normally operated by said tape perforator for selectively operating said tape reader and said tape transmitter at the same rate of speed at which said tape perforator perforates said tape, a generator for operating said tape transmitter at a predetermined faster speed, and tape controlled means operated in response to the storage of a predetermined amount of tape in said storage bin for selecting said generator in order to operate said tape transmitter at said faster predetermined rate of speed.

16. The system set forth in claim 15, wherein the reduction in the amount of tape accumulated in said storage bin below said predetermined amount restores said tape controlled means in order to reoperate said tape transmitter under control of said tape perforator operated means.

17. In a telegraph system having a tape perforator for perforating a tape in accordance with received telegraph messages and having a tape transmitter for transmitting said messages perforated on said tape, a storage bin between said tape perforator and said tape transmitter for storing said tape after it has been perforated, means normally operated by said tape perforator for selectively operating said tape transmitter at the same rate of speed at which said tape perforator perforates said tape in accordance with said received messages, a generator for operating said tape transmitter at a predetermined faster speed, means operated in response to the termination of the operation of said tape perforator at the end of a message for selecting said generator in order automatically to operate said tape transmitter at said faster predetermined rate of speed and independently of said tape perforator until all of said tape stored in said storage bin has been transmitted by said tape transmitter.

18. The system set forth in claim 17, wherein said tape transmitter is locked to said generator to transmit said messages perforated on said tape at said faster predetermined rate until all of said tape stored in said storage bin is transmitted.

References Cited in the file of this patent

UNITED STATES PATENTS

| | | |
|---|---|---|
| 1,174,236 | Dixon | Mar. 7, 1916 |
| 1,192,171 | Dixon | July 25, 1916 |
| 1,202,952 | Adams | Oct. 31, 1916 |
| 1,253,818 | Harris | Jan. 15, 1918 |
| 2,353,608 | Zenner | July 11, 1944 |